(12) United States Patent
Welker et al.

(10) Patent No.: US 9,140,814 B2
(45) Date of Patent: Sep. 22, 2015

(54) SYSTEM AND METHOD OF USING AUTONOMOUS UNDERWATER VEHICLE TO FACILITATE SEISMIC DATA ACQUISITION

(75) Inventors: Kenneth E. Welker, Nesoya (NO); Ottar Kristiansen, Oslo (NO); Morten Svendsen, Voyenenga (NO); Julian Edward Kragh, Finchingfield (GB)

(73) Assignee: WesternGeco L.L.C., Houston, TX (US)

( * ) Notice: Subject to any disclaimer, the term of this patent is extended or adjusted under 35 U.S.C. 154(b) by 1496 days.

(21) Appl. No.: 12/473,667

(22) Filed: May 28, 2009

(65) Prior Publication Data

US 2010/0302901 A1 Dec. 2, 2010

(51) Int. Cl.
*G01S 15/00* (2006.01)
*G01V 1/38* (2006.01)
*B63G 8/00* (2006.01)

(52) U.S. Cl.
CPC ............ *G01V 1/3843* (2013.01); *B63G 8/001* (2013.01)

(58) Field of Classification Search
CPC .............................. G01V 1/3843; G05D 1/00
USPC ................................................ 367/87–89, 902
See application file for complete search history.

(56) References Cited

U.S. PATENT DOCUMENTS

| | | | |
|---|---|---|---|
| 3,794,965 A | 2/1974 | Charske | |
| 4,118,782 A | 10/1978 | Allen et al. | |
| 4,509,151 A | 4/1985 | Anderson | |
| 4,992,993 A * | 2/1991 | Chambers | 367/21 |
| 5,294,847 A | 3/1994 | Grossman et al. | |
| 5,856,954 A | 1/1999 | Grall | |
| 5,894,450 A * | 4/1999 | Schmidt et al. | 367/134 |
| 6,256,589 B1 | 7/2001 | Guimarães | |
| 6,474,254 B1 | 11/2002 | Ambs et al. | |
| 7,293,520 B2 | 11/2007 | Hillesund et al. | |
| 7,417,924 B2 | 8/2008 | Vigen et al. | |
| 7,496,000 B2 * | 2/2009 | Vosburgh et al. | 367/134 |
| 7,796,466 B2 | 9/2010 | Combee et al. | |
| 2003/0074140 A1 | 4/2003 | MacKay | |
| 2008/0192570 A1 | 8/2008 | Tenghamn et al. | |
| 2009/0092005 A1 | 4/2009 | Goujon et al. | |
| 2010/0045295 A1 | 2/2010 | Mittet et al. | |
| 2010/0185348 A1* | 7/2010 | Webb | 701/21 |
| 2012/0020185 A1 | 1/2012 | Welker et al. | |
| 2012/0069702 A1 | 3/2012 | Muyzert et al. | |

OTHER PUBLICATIONS

Widditsch, "SPURV—The First Decade", Oct. 1973.*
Widditsch, "SPURV-The First Decade", Oct. 1973.*
Lacombe, "Correcting for water-column variations" The Leading Edge, Feb. 2009.*
PCT Search Report, dated Jan. 25, 2011, Application No. PCT/US2010/036468.
Extended European Search Report of European Application No. 10781239.8 dated Feb. 14, 2013: pp. 1-12.
Anonymous, Automated Sound Velocity Profiler (ASVP), InterOcean systems, inc., Specification Sheet, 2010: pp. 1-2.

(Continued)

*Primary Examiner* — Krystine Breier (57) ABSTRACT

A technique facilitates the use of seismic data. The technique utilizes an autonomous underwater vehicle to obtain data on water column characteristics in a seismic survey area. The data can be used to adjust aspects of the seismic survey data and/or the seismic survey technique.

24 Claims, 4 Drawing Sheets

(56) References Cited

OTHER PUBLICATIONS

Anonymous, "Expendable Probes," Lockheed Martin Sippican, Product List, 2010: pp. 1-2, <www.sippican.com/contentmgr/showdetails.php/id/312>.

Anonymous, "Moving Vessel Profiler," ODIM Brook Ocean, Brochure/Product Details, 2008: pp. 1-9, <http://web.archive.org/web/20080225221946/http://www.brooke-ocean.com/mvp_main.html>.

Anonymous, "Sound Velocity Sensors & Profilers," Sound Velocity Sensors, Instruments, Profilers, SVP, Speed of Sound, Valeport, 2010: pp. 1-3.

Bertrand et al., "Seawater velocity variations and real-time reservoir monitoring," The Leading Edge, Apr. 2003: pp. 351-355.

Brittan et al., "Optimizing the removal of seismic interface noise," The Leading Edge, Feb. 2008: pp. 166-175.

Gulunay, "Two different algorithms for seismic interference noise attenuation," The Leading Edge, Feb. 2008: pp. 176-181.

Kommedal et al., "Annual Meeting Selection: A case of SI attenuation in 4D seismic data recorded with a permanently installed array," Geophysics, May-Jun. 2007, vol. 72(3): pp. Q11-Q14.

Krohn et al., "Introduction to this special section—Seismic Noise," The Leading Edge, Feb. 2008: pp. 163-165.

Lacombe et al., "Correcting for water-column variations," The Leading Edge, Feb. 2009: pp. 198-201.

"Seaglider Summary," Applied Physics Laboratory, University of Michigan, originally retrieved 2008: p. 1.

Sleeper et al., "OTC 18113: Bathymetric Mapping and High-Resolution Seismic Profiling by AUV in MC 118 (Gulf of Mexico)," Offshore Technology Conference, 2006: pp. 1-9.

"Slocum Glider," Webb Research Corporation, originally retrieved 2008: pp. 1-2, <http://web.arachive.org/web/20071024201851/http://www.webbresearch.com/slocum.htm>.

Smith, "Removal of Rig Reflection Energy from Seismic Data," InTouchSupport.com, retrieved Aug. 2009: pp. 1-2, <http://intouchsuupport.com/intouch/methodinvokerpage.cfm?caseid=4751351>.

Stojanovic, "Underwater Acoustic Communication," Encyclopedia of Electrical and Electronics Engineering, 1999: pp. 1-33, <http://www.mit.edu/~millitsa/resources/pdfs/ency.pdf>.

Tham, "Attenuation of seismic source noise reflected off the rigs & rig noise travelling through the water to receivers," InTouchSupport.com, retrieved Aug. 2009: pp. 1-2, <http://intouchsuupport.com/intouch/methodinvokerpage.cfm?caseid=4244776>.

Wang, "Autonomous Underwater Vehicle (AUV) Pat Planning and Adaptive On-board Routing for Adaptive Rapid Environmental Assessment," Massachusetts Institute of Technology, Doctoral Thesis, 2007: pp. 1-204.

* cited by examiner

SYSTEM AND METHOD OF USING AUTONOMOUS UNDERWATER VEHICLE TO FACILITATE SEISMIC DATA ACQUISITION

BACKGROUND

In a variety of marine environments, seismic surveys can be taken to gain a better understanding of geological formations beneath a body of water. Relatively large marine regions can be surveyed by a surface vessel or vessels towing seismic streamer cables through the water. Another vessel, or the same vessel, can be employed in providing a seismic source, such as a compressed air gun utilized to generate acoustic pulses in the water. The seismic source is used to generate energy that propagates down through the water and into the geological formation. Marine survey data on the geological formation can be obtained by detecting the energy reflected from interfaces between geological formations. Hydrophones are connected along the seismic streamer cables to detect the reflected energy.

Accurate collection of data by the hydrophones is affected by changes in characteristics of the water column, such as changes in sound velocity between regions of the water column in the survey area. The travel time of the reflected energy/signal through the water column is needed to accurately establish, for example, the depth of the target reflecting surface. In some applications, sound velocity probes are dropped with varying frequency from a survey vessel during the seismic survey to collect data on sound velocity. The usefulness and frequency of the drops, however, can be limited by several factors, including operational safety considerations, risk of tangling the sound velocity probe line with the seismic spread equipment, requirements of the survey client, type of survey, e.g. 4D versus 3D, and knowledge of the survey space and time rate of sound velocity variation.

Current methods to measure sound velocity in the water column during a seismic survey operation include the use of both retrievable and expendable probes. The probes can be deployed either by conventional drop systems or advanced continuous drop systems. However, the approaches can be relatively expensive, cumbersome, and limited in adaptability.

SUMMARY

In general, the present invention provides a methodology and system for enhancing the usefulness of seismic data. The technique utilizes an autonomous underwater vehicle (auv) to obtain data on water column characteristics in a seismic survey area. The data can then be used to aid in the analysis of seismic data and/or to adjust aspects of the seismic survey.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a technique that can be used to improve the usefulness of seismic survey data. The system and methodology utilize an autonomous underwater vehicle to obtain data on water column characteristics in a seismic survey area. The data is then used, e.g. processed, with corresponding seismic data obtained during a seismic survey to improve, for example, the accuracy of the seismic data. In one embodiment, the autonomous underwater vehicle is programmed to sample water column characteristics that enable estimation of the time and space varying sound velocity of the water column in the seismic survey area.

The autonomous underwater vehicle is not physically coupled to any surface seismic vessels and moves independently underwater to desired regions of the seismic survey area. The autonomous underwater vehicle can be preprogrammed and/or programmed during operation to follow desired trajectories underwater. The underwater trajectories are selected to obtain data on the desired water column characteristics, e.g. sound velocity characteristics, which may vary throughout different regions of the water column. Data is transferred from the autonomous underwater vehicle to a desired collection location, e.g. to a processing/control system on a surface vessel. Similarly, data can be transferred from the surface vessel to the autonomous underwater vehicle. The transfer of data from the surface vessel to the autonomous underwater vehicle may be used to iteratively program the autonomous underwater vehicle to follow new paths through the water column. For example, the autonomous underwater vehicle may be iteratively programmed to follow water column characteristic interfaces, such as sound velocity interfaces.

According to one embodiment, the autonomous underwater vehicle is a glider programmed to glide along desired trajectories. Individual gliders or groups of gliders can be deployed in a seismic survey area and programmed to sample the water column. For example, the gliders may be programmed to detect water column characteristics indicative of sound velocities in the survey area. In some embodiments, data from the gliders is collected during surfacing; and data also can be downloaded to the glider during the same surfacing activity. In one embodiment, data is transmitted between the glider and a surface vessel via a satellite communication system, such as the Iridium satellite system. One example of a suitable type of glider is the "Seaglider" developed by the Applied Physics Laboratory—University of Washington in cooperation with the University of Washington School of Oceanography.

By way of example, the sampling trajectory selected for the glider may be directed from a global positioning system (e.g. Global Navigation Satellite System GNSS) starting point and by dead reckoning, inertial navigation measurements, altimeters, compasses, and with surface survey vessel acoustic methods, such as long baseline and short baseline measurement methods. In an alternate embodiment, communications also can be achieved through underwater acoustic and/or optical telemetry. Obtaining a position for the glider through active or passive acoustic distance measurement and subsequent communication to the glider allows an operator on the surface survey vessel to control the trajectory of the glider. The history of descent or ascent enables an operator to download information regarding an updated desired path for the glider. The process of updating the glider path also can be automated according to specific objectives for changing the glider trajectory. For example, objectives for changing the glider trajectory may include avoiding obstructions and other vehicles, e.g. surface vessels or seismic spread equipment deployed to acquire the survey data, which may be moving through the survey area during a scheduled surfacing of the glider.

In one embodiment, the autonomous underwater vehicle, e.g. glider, is used to map the sound velocity of the survey area for geophysical signal propagation. Because the autonomous underwater vehicle can be redirected by updating its program, the glider may be used to follow water column characteristic interfaces, such as sound velocity (density) interfaces detected during an earlier survey to define the boundaries of these interfaces and to monitor movement of the interfaces. For example, the autonomous underwater vehicle enables sound velocity gradients to be followed so as to obtain the most information from the shortest travel distances. In many applications, the programmed trajectory may be updated iteratively based on local feedback from the survey vessel.

In another embodiment, the autonomous underwater vehicle can be used to follow a sound velocity gradient or a water mass boundary based on internal local measurements. The measurements are translated to steering commands that drive the autonomous underwater vehicle in a direction that is desired. For example, if the wall of an eddy is to be mapped, the autonomous underwater vehicle can be used to seek the water column salinity and temperature interface values that define the wall or boundary. The autonomous underwater vehicle also can be used to monitor the presence and location of marine mammals in the survey area to conform to local regulations that may affect seismic operations. For example, the autonomous underwater vehicle can be programmed to move up and down at edges of the survey area or at other/additional strategic locations to detect marine mammal sounds by hydrophones. Data on the marine mammals can then be relayed back to a surface vessel or other collection location.

Figure 1:
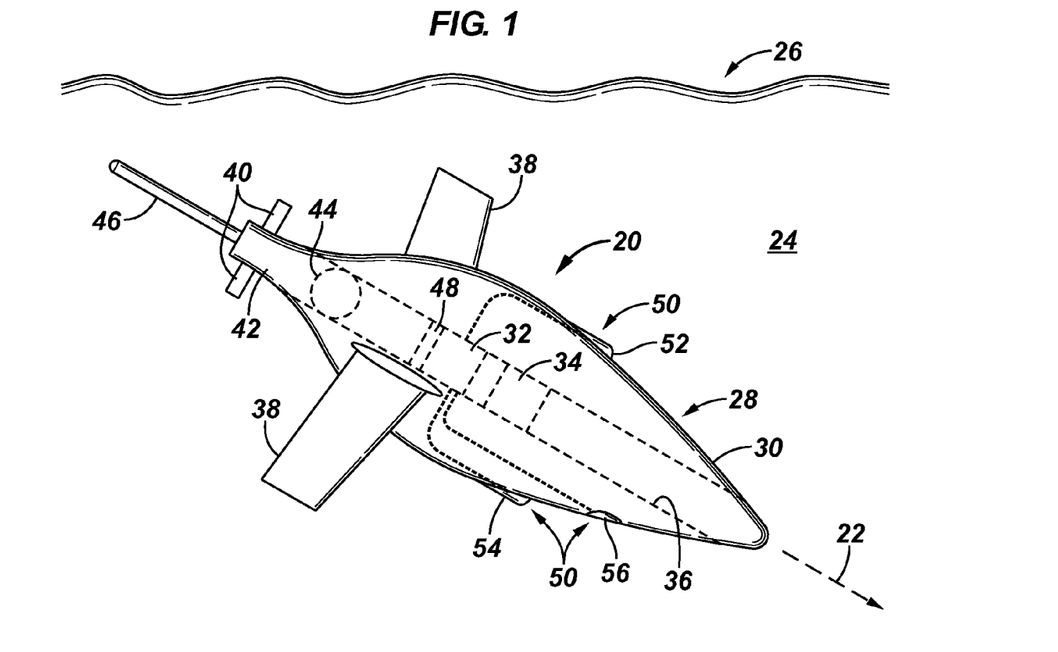
FIG. 1 is a schematic view of an autonomous underwater vehicle deployed along a trajectory underwater to collect data, according to an embodiment of the present invention.

Referring generally to FIG. 1, an autonomous underwater vehicle 20 is illustrated according to an embodiment of the present invention. In this embodiment, vehicle 20 is illustrated as following a desired trajectory 22 through a water column 24 of a seismic survey area 26. Although autonomous underwater vehicle 20 may be designed in a variety of configurations, one example is the illustrated glider 28 that can be programmed to glide along the desired trajectory 22.

In the embodiment illustrated, the autonomous underwater vehicle 20, e.g. glider, comprises an outer shell or hull 30 that is hydrodynamically designed to have a low coefficient of drag as the vehicle moves through the water. The autonomous underwater vehicle 20 also may comprise a control system 32, such as a processor base control system, powered by a suitable battery 34. By way of example, battery 34 may comprise a battery pack movable along an internal structure 36 to adjust the balance/inclination of the autonomous underwater vehicle 20. Additionally, wings 38 are mounted to extend from shell 30 in a manner that helps control the gliding of vehicle 20 along trajectory 22. A plurality of stabilizer fins 40 may be attached to a tail section 42 of shell 30 to further stabilize the movement of vehicle 20 along desired trajectories 22. Additionally, further control over autonomous underwater vehicle 20 can be achieved by selectively inflating and deflating a bladder 44 to change the buoyancy of vehicle 20. The bladder 44 may be inflated, for example, to cause vehicle 20 to surface for transmission of data to or from a surface vessel.

Transmission of data from autonomous underwater vehicle 20 to a surface location, e.g. a surface vessel, and transmission of data to vehicle 20 can be accomplished via an antenna 46 couple to a suitable transceiver 48 which, in turn, is connected to control system 32. By way of example, antenna 46 may be mounted to extend from tail section 42. Accordingly, when bladder 44 is inflated to cause vehicle 20 to surface, antenna 46 extends above the water line to facilitate transmission of data. It should be noted, however, that underwater data transmission techniques also can be utilized. Additionally, control system 32 can be designed to exercise automatic control over the movement of vehicle 20. For example, control 32 may comprise a proportional integral derivative (PID) controller that can be used to respond to sensed characteristics in the water column. In some applications a PID controller or other suitable controller is used to follow a gradient, edge, boundary, or other phenomenon in the water column.

The data on water column characteristics is detected via sensors 50 that are coupled to control system 32. For example, one or more sound velocity sensors 52 may be used to monitor one or more characteristics indicative of the sound velocity at various regions of the water column 24 as vehicle 20 progresses along desired trajectories 22. By way of example, the sound velocity sensors 52 may comprise density sensors able to detect the varying density of the water and water column 24. However, additional or other types of sensors also can be employed to detect characteristics indicative of sound velocity at specific positions along each trajectory 22. Other types of sensors 50 also may be used to collect other data throughout the seismic survey area 26. For example, sensors 50 may comprise one or more hydrophones 54 and/or accelerometers 56. By way of example, sensors 54 and 56 can be used to monitor noise levels in the seismic survey area to aid in the design of filters better able to enhance the signal to noise ratio in filtered streamer data obtained during the actual seismic survey.

Figure 2:
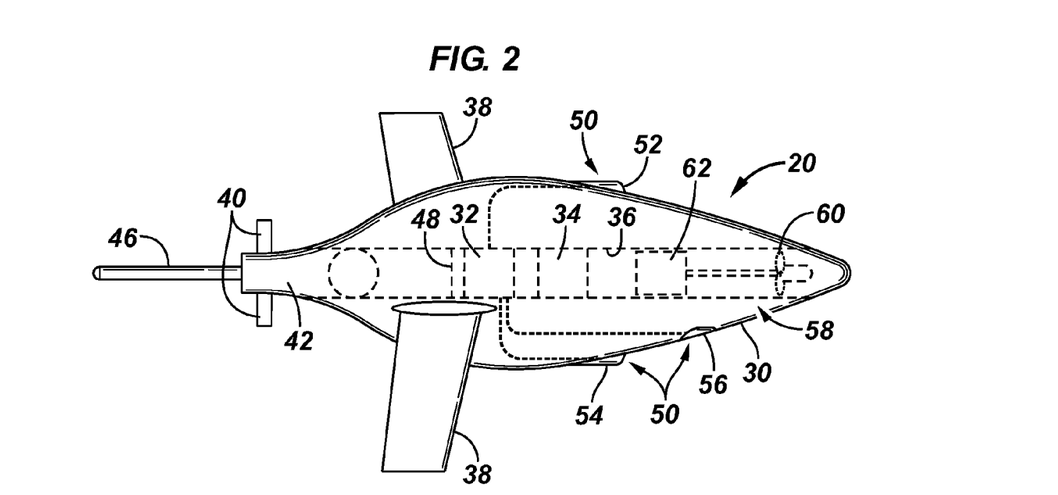
FIG. 2 is a schematic view of another example of an autonomous underwater vehicle, according to an alternate embodiment of the present invention.

The autonomous underwater vehicle 20 may have a variety of other configurations and incorporate additional or alternate components. In FIG. 2, for example, an alternate embodiment of autonomous underwater vehicle 20 is illustrated with a charging system 58 designed to enhance the life of battery 34. In this example, an impeller 60 is coupled to a generator 62 to charge battery 34. As autonomous underwater vehicle 20 descends along a desired trajectory 22, water flows through impeller 60 to rotate the impeller and power generator 62. The generator 62 outputs current to battery 34 to charge the battery for longer battery life during operation of the various systems on autonomous underwater vehicle 20. However, charging system 58 also facilitates the use of battery 34 to power an optional propulsion system that can be used to move vehicle 20 through water column 24.

Figure 3:
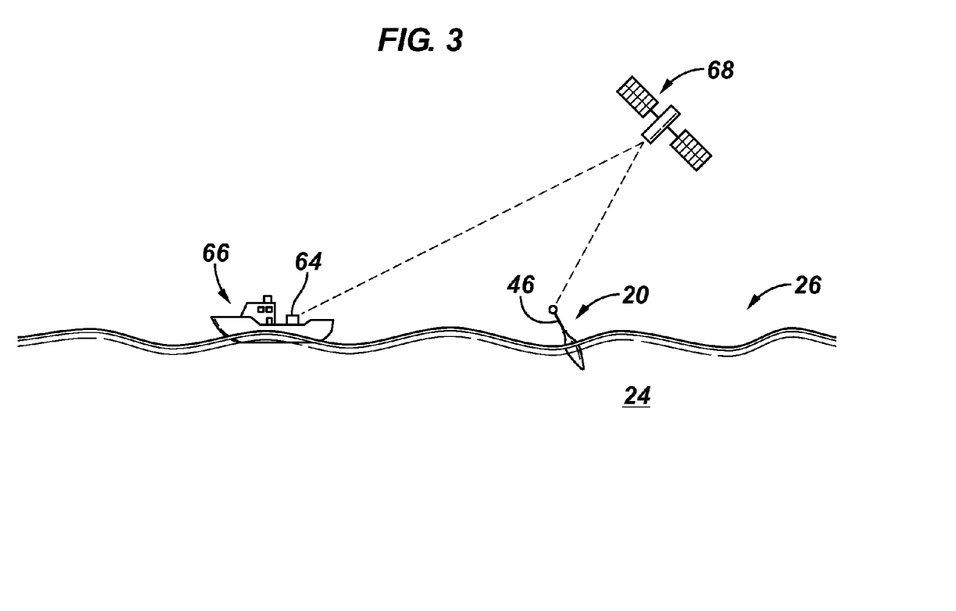
FIG. 3 is a schematic illustration representing the transfer of data between the autonomous underwater vehicle and a surface vessel, according to an embodiment of the present invention.

As illustrated in FIG. 3, autonomous underwater vehicle 20 can be designed to communicate with a surface control system 64 located on, for example, a surface vessel 66. Surface vessel 66 may comprise one of the seismic survey vessels or an independent vessel for use in obtaining data from vehicle 20 and for controlling the movement of vehicle 20 through water column 24. In the embodiment illustrated, autonomous underwater vehicle 20 communicates with surface control system 64 via a satellite communication system 68. As described above, bladder 44 may be inflated to increase the buoyancy of vehicle 20 and to move the vehicle to the surface such that antenna 46 extends through the surface of the water, as illustrated.

The autonomous underwater vehicle 20 also can be moved to the surface to facilitate retrieval. Retrieval may be accomplished by monitoring movement of vehicle 20 with onboard positioning systems, as described above. Additionally, or in the alternative, the vehicle 20 can utilize the satellite communication system 68 to send a GNSS fix via satellite after surfacing. A homing beacon signal system also can be incorporated into the vehicle 20 and a homing beacon signal can be used as a primary or backup locator. In addition to being a locator, the relationship can be reversed so the retrieval platform emits a homing beacon signal to bring the autonomous underwater vehicle 20 home. This allows the retrieval platform to continue with its primary mission profile until the autonomous underwater vehicle is close enough to be retrieved.

Figure 4:
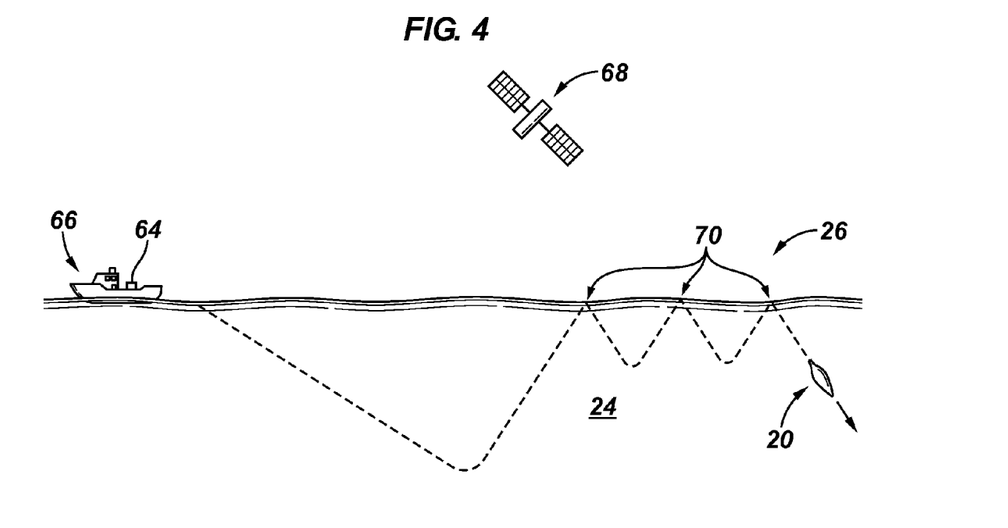
FIG. 4 is a schematic illustration representing ongoing adjustment to the trajectories traveled by the autonomous underwater vehicle, according to an embodiment of the present invention.

By utilizing satellite communications system 68 or another suitable communication system, data can be repeatedly sent to autonomous underwater vehicle to adjust the trajectory or trajectories of vehicle 20 during operation without retrieval of the vehicle, as illustrated in FIG. 4. For example, surface control 64 may be used in cooperation with communication system 68 to send new program instructions to autonomous underwater vehicle 20 at each surfacing location 70. The updating of program instructions and the changes to trajectory can be conducted on an iterative basis to pursue desired underwater regions or phenomena. For example, the program instructions controlling trajectory 22 can be updated to enable vehicle 20 to follow or otherwise explore a sound velocity interface in water column 24.

In an application where the autonomous underwater vehicle 20 is following a boundary defining a water column characteristic, e.g. a current boundary, one method for obtaining the coordinates of the boundary is by tracking the autonomous underwater vehicle from vessels engaged in acquiring seismic data. This can be achieved with various acoustic positioning systems, including long baseline systems, short baseline systems, ultra short baseline systems and other suitable systems. The trajectory of the vehicle 20 also may be transmitted back to the vessel during surface visits, as described above. In the latter application, the trajectory can be determined by dead reckoning between GNSS fixes.

In some of these applications, the processing system 32 of vehicle 20 can be used to compute the coordinates of the vehicle. For example, hydrophones 54 can be positioned on the autonomous underwater vehicle 20 at specific geometries and separation distances to enable operation of a short baseline system or an ultra short baseline system type of positioning system. If the depth measurement is known, two or more hydrophones 54 can be used to enable determination of position. Otherwise, three or more hydrophones are positioned on vehicle 20 with sufficient separation to measure the phase difference between an acoustic wave transmitted by a transmitter on a home platform, such as a transmitter on surface vessel 66. If the acoustic signal has the coordinates of the transmitter modulated on it, the internal processing system 32 of the vehicle 20 can compute its own coordinates. The coordinates can be stored and/or used in making steering decisions. For example, decisions can be made to steer toward the transmitter or to steer according to a planned trajectory.

The trajectory of the autonomous underwater vehicle 20 can be selected/designed to acquire, for example, water current and sound velocity information as near in time is practically possible to the passage of the survey spread through the same survey area. This approach enables very accurate positioning of the survey spread equipment. Based on mapping of the current regime revealed by the autonomous underwater vehicle trajectories, the data acquisition can be adapted to obtain the optimum spread element positions for time lapse surveys.

Based on the trajectory of the autonomous underwater vehicle 20, the current can be mapped in the survey area. This current information can be combined with other information, such as acoustic Doppler current profiler current meter data, to be used as input to a local current model. The current model predicts current in areas where no measurements are available but that will be traversed by the seismic spread. The predictions enable various control algorithms used by the spread control elements to anticipate what steering commands should be sent to the steering apparatus to optimize the trajectory of the seismic spread for geophysical objectives, such as coverage and time lapse repeatability.

During movement of autonomous underwater vehicle 20 through water column 24, the position of the vehicle is tracked and the data obtained is stored for transmission to surface control 64. For example, the data obtained may be transmitted to surface control 64 for further analysis during surfacing of vehicle 20. Knowledge of water column characteristics can be used to facilitate and improve analysis of seismic data obtained during corresponding seismic surveys of the seismic survey area 26. By way of a specific example, data can be accumulated on the varying sound velocity through water column 24, and this knowledge is then used in subsequent data processing to improve the quality of the final image generated from seismic data obtained during the corresponding seismic survey. A more detailed knowledge of the varying sound velocity through the water column as a function of depth, position and time can further improve the final image.

The sound velocity data and/or other water column characteristic data may be utilized in a variety of applications. For example, sound velocity data can be used by surface control 64 or other suitable processing systems in the computation of "static," i.e. time shift, corrections applicable to the seismic data obtained during a corresponding seismic survey of the seismic survey area 26. When sound velocity through the water column varies, the travel time of the seismic arrivals during the seismic survey also varies and results in undesired time shifts on the seismic data. In 3D surveys, varying sound velocity through the water can cause significant errors that require correction.

In one application, data from one or more autonomous underwater vehicles 20 is used to adjust the seismic survey spread elements. Initially, the coordinates of the autonomous underwater vehicle or vehicles is obtained. As described above, a variety of methods can be used to obtain the coordinates, including instrumentation aided dead reckoning or acoustic positioning techniques. One or both of control system 32 and surface control 64 is used to process collected data and to separate, for example, current direction and amplitude of force from lift induced forces at the autonomous underwater vehicle. Based on the processed data, various adjustments can be made to steering control spread elements to optimize the spread element trajectory for specific geophysical objectives. Examples of adjustments include surface vessel rudder adjustments, qfin wing adjustments, source steering adjustments, and winch adjustments. The trajectories of the autonomous underwater vehicles can be optimized to determine currents ahead of the seismic spread and to provide the most recent and accurate current regime.

By utilizing autonomous underwater vehicles 20, e.g. gliders, data with a greater level of detail is obtained and applied in computing the static corrections. The vehicles 20 can be used to fully sample the water column in both space (X and Y positions) and in depth. Consequently, more accurate and locally specific corrections can be applied to the seismic data. Additionally, the vehicles 20 can be used over time to continuously sample the water column and to detect ongoing changes in the sound velocity for continued correction of the seismic data.

In a related application, the static corrections are used on surface control 64 or another suitable system in the processing of time-lapse data. The static corrections can be particularly important when processing time-lapse data because small changes in the seismic response are easily masked by time shifts. By utilizing the detailed data/information provided by vehicles 20, the time-lapse images that are constructed based on the seismic data can be significantly improved.

In other applications, the autonomous underwater vehicles 20 are used to obtain sufficient data to construct a water sound velocity model. In creating very high resolution images, for example, the "static" time corrections may not be sufficient to create the desired image. In this situation, the data obtained by vehicles 20 can be used in constructing the water sound velocity model, and the model can be directly incorporated in either re-datuming the seismic data or in the imaging step itself.

As described above, one or more autonomous underwater vehicles 20 can be used to obtain other types of data. For example, additional sensors 50, such as hydrophones 54 and/or accelerometers 56, may be incorporated into vehicle 20 to record seismic data. The seismic data recorded by the autonomous underwater vehicle 20 is used to complement the seismic data recorded conventionally during a corresponding seismic survey. For example, with a stationary seismic source recorded by a slowly moving autonomous underwater vehicle 20, e.g. a glider, a fully sampled "shot-domain" record can be recorded. Sampling seismic signals with varying depth also can add value to seismic data that emphasizes different frequency content. The additional sampling is not limited by conventional spread dimensionality or by the cost of operating a seismic vessel to obtain higher crossline sampling density. Depending on the specific application, the complementary seismic data obtained by the glider or other autonomous underwater vehicle can be used to supplement the seismic data in a variety of analyses. As described above, hydrophones can be incorporated into the autonomous underwater vehicle 20 for recording the sound of marine mammals and for detecting the presence of those mammals, e.g. whales. One operational mode for autonomous underwater vehicles 20 is as virtual buoys. In this mode, the autonomous underwater vehicles rise and fall in the same vertical space with no significant horizontal motion. The vehicles 20 can be arranged around the periphery of the survey area and can be used to detect and triangulate to marine mammals.

The detection of marine mammals can be carried out by vehicle 20 simultaneously or separately with respect to other vehicle functions, e.g. determining sound velocities and current mapping within the survey area. In some applications, one or more additional hydrophones 54 can be appropriately designed and mounted on autonomous underwater vehicle 20 to capture the range of frequencies expected from marine mammals. The additional hydrophones 54 are fitted into vehicle 20 together with dedicated processing system 32 and other sensors 50, such as the sound velocity and position determination sensors. This allows each vehicle 20 to operate as multifunctional vehicle in the survey area during seismic acquisition.

If the signal of a marine mammal, e.g. a whale, has a frequency high enough so that the separation of the hydrophones 54 allow vehicle 20/processing system 32 to measure the signal phase difference, the marine mammal can be positioned relative to the vehicle. It should also be noted that in contrast to hydrophones used in streamers of the survey spread equipment, the hydrophones 54 can be specifically designed to capture the frequencies of whales or other marine mammals. In marine mammal detection applications, the vehicles 20 may be located away from the survey spread equipment to locate marine mammals and to predict their movements. The data obtained can then be used for line planning with respect to the survey spread equipment to avoid marine mammals that would otherwise travel through the survey area.

Figure 5:
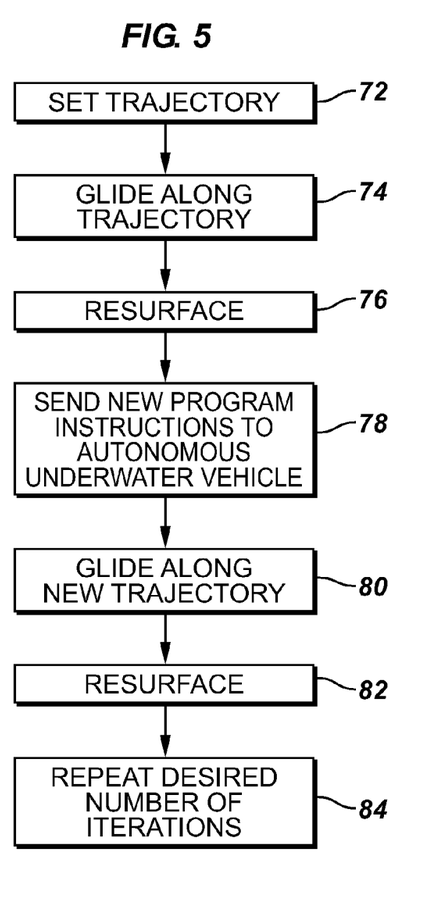
FIG. 5 is a flowchart illustrating one example of a methodology for utilizing the autonomous underwater vehicle, according to an embodiment of the present invention.

In operation, the autonomous underwater vehicles 20 may be used in a variety of ways to improve the usefulness of seismic survey data. In one operational example, each autonomous underwater vehicle 20 is initially programmed to glide or otherwise move along a set trajectory, as illustrated by block 72 of the flowchart illustrated in FIG. 5. The vehicle 20 is then released to glide along the desired trajectory, as illustrated by block 74, and to collect data on water column characteristics until resurfacing, as illustrated by block 76. While at the surface, data may be transmitted from vehicle 20 to surface control 64 located on, for example, surface vessel 66; and data also may be sent from surface control 64 to vehicle 20. For example, new program instructions can be sent to vehicle 20, as illustrated by block 78. Based on the new program instructions, the trajectory is revised so that vehicle 20 glides along a new trajectory, as illustrated by block 80. Upon completion of the trajectory, the autonomous underwater vehicle resurfaces, as illustrated by block 82, for the transfer of data to or from surface control 64. This process can be used as an iterative process and repeated until the desired data on the water column 24 is obtained, as illustrated by block 84.

Figure 6:
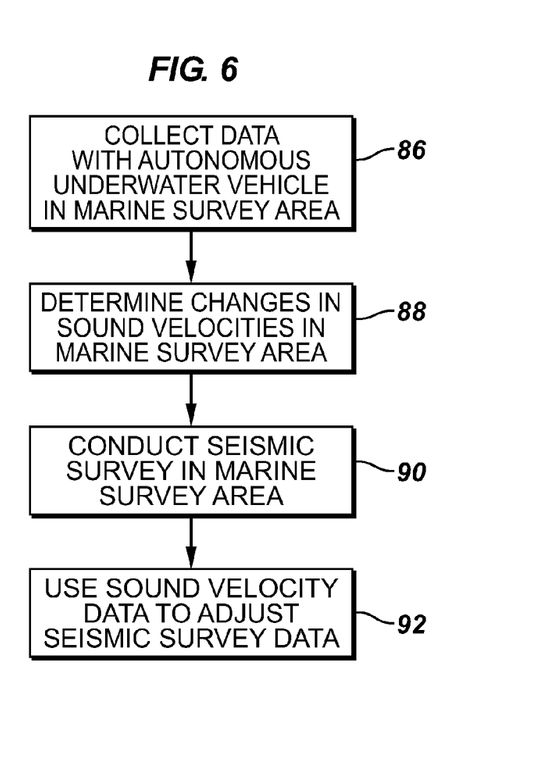
FIG. 6 is a flowchart illustrating another example of a methodology for utilizing the autonomous underwater vehicle, according to an embodiment of the present invention.

In a specific application, the autonomous underwater vehicle 20 (or vehicles) is used to collect data on sound velocities in a marine survey area, as indicated by block 86 of FIG. 6. For example, appropriate sensors 50 may be used to monitor water density or other characteristics indicative of sound velocity at that particular position within the survey area. As the movement of vehicle 20 is tracked along trajectories 22 through the marine survey area, the vehicle 20 is able to determine changes in sound velocities throughout the area, as indicated by block 88. A seismic survey also is conducted in the marine survey area, as indicated by block 90. The seismic survey may be conducted immediately following the collection of data by autonomous underwater vehicle 20, or the seismic survey can be conducted while the vehicle 20 is collecting data or prior to the collection of data by vehicle 20. The data on changes in sound velocities in the marine survey area is used to adjust the seismic survey data, as indicated by block 92. The adjustments to the seismic survey data can be performed on surface control system 64 according to various programs and/or models as discussed above.

Figure 7:
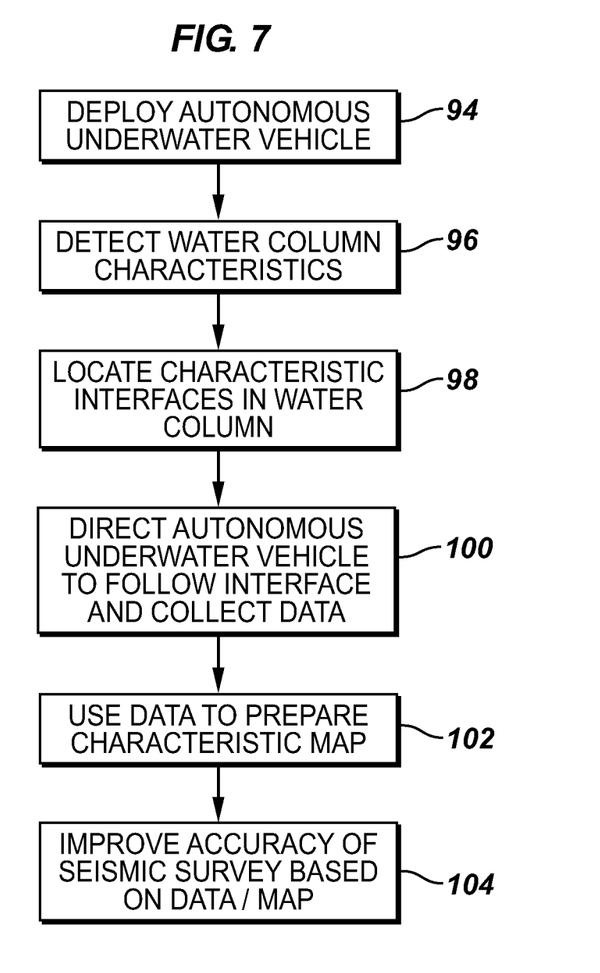
FIG. 7 is a flowchart illustrating another example of a methodology for utilizing the autonomous underwater vehicle, according to an embodiment of the present invention.

However, autonomous underwater vehicle also can be used in the detection and/or monitoring of a variety of water column characteristics, as indicated generally by the flowchart example of FIG. 7. In this general example, one or more autonomous underwater vehicles 20 are initially deployed, as indicated by block 94. Depending on the sensors incorporated into vehicles 20, the vehicles can be used to detect one or more desired water column characteristics, as indicated by block 96. The ability to continually update or change the trajectory of the autonomous underwater vehicles enables an operator to locate characteristic interfaces in the water column, as indicated by block 98. The interfaces can then be explored or followed to collect detailed data on the extent and location of the interface, as indicated by block 100. In some applications, the interface data and other data collected from the autonomous underwater vehicles 20 is used to prepare a map of the characteristics throughout the seismic survey area, as indicated by block 102. The map created and/or the other data obtained by the autonomous underwater vehicles 20 then may be used to improve the accuracy of the actual seismic survey, as indicated by block 104.

Generally, the autonomous underwater vehicles 20, e.g. gliders, may be used in cooperation with conventional survey vessels to enable more frequent data exchange and trajectory updates. Additionally, the vehicles 20 may be combined with a variety of other sensors and components that enabled the collection, monitoring, and/or transfer of data with processing centers. For example, the vehicles 20 may be fitted with seismic data recording sensors to both complement conventional acquisition and to acquire seismic data independently. The autonomous underwater vehicles 20 also may be used in a wide variety of applications, including the detection and/or mapping of varying sound velocities through a seismic survey area. It should further be noted that the size shape and structure of the vehicle 20 can be adjusted for various factors, including glide distance, environment, vehicle components, obstacles, and other factors that can affect the function of autonomous underwater vehicles 20. A variety of techniques also can be used to determine or track the position of the vehicles 20 in the water column, as discussed above. In many applications, the vehicles 20 are able to glide while collecting data. However, propulsion systems also may be incorporated into the autonomous underwater vehicle to facilitate travel throughout the seismic survey area.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method for facilitating seismic data acquisition, comprising:
utilizing an autonomous underwater vehicle to obtain data on water column characteristics in a seismic survey area;
directing the autonomous underwater vehicle along a water column characteristic interface by changing the path along which the autonomous underwater vehicle moves through the seismic survey area while obtaining the data;
transmitting the data to a collection location; and
employing the data to correct inaccuracies of seismic data obtained during a seismic survey of the seismic survey area.

2. The method as recited in claim 1, wherein utilizing comprises utilizing a glider programmed to glide underwater along a desired trajectory.

3. The method as recited in claim 2, further comprising updating the desired trajectory iteratively.

4. The method as recited in claim 1, wherein utilizing comprises utilizing the autonomous underwater vehicle to obtain sound velocity data in the seismic survey area.

5. The method as recited in claim 4, wherein utilizing comprises automatically directing the autonomous underwater vehicle to sound velocity interfaces.

6. The method as recited in claim 1, further comprising utilizing an onboard generator system to charge the autonomous underwater vehicle.

7. The method as recited in claim 1, wherein transmitting comprises transmitting data via satellite communication.

8. The method as recited in claim 1, wherein transmitting comprises transmitting data from the surface vessel to the autonomous underwater vehicle.

9. The method as recited in claim 1, wherein employing comprises computing static corrections to account for changes in sound travel time during the seismic survey.

10. The method as recited in claim 9, further comprising using the static corrections to facilitate the processing of time-lapse data.

11. The method as recited in claim 1, wherein employing comprises using the data to create a water-sound velocity model.

12. The method as recited in claim 1, further comprising mounting at least one hydrophone and at least one accelerometer to the autonomous underwater vehicle to obtain and record seismic data.

13. A method, comprising:
obtaining data in a marine survey area with an autonomous underwater vehicle;
using the data to determine a water column characteristic at multiple locations in the marine survey area;
utilizing an internal control system of the autonomous underwater vehicle to exercise automatic control over movement of the autonomous underwater vehicle so as to cause the autonomous underwater vehicle to follow a boundary of the water column characteristic based on the data obtained in the marine survey area; and
employing the water column characteristics to improve the usefulness of seismic data obtained during a seismic survey of the marine survey area.

14. The method as recited in claim 13, wherein obtaining comprise obtaining sound velocity data with a glider that glides underwater according to programmed instructions.

15. The method as recited in claim 13, wherein employing comprises computing static corrections to account for changes in sound travel time during the seismic survey.

16. The method as recited in claim 15, further comprising using the static corrections to facilitate the processing of time-lapse data.

17. The method as recited in claim 14, further comprising employing the glider to obtain and record supplemental seismic data; and comparing the supplemental seismic data to the seismic data obtained during the seismic survey.

18. The method as recited in claim 13, wherein obtaining comprises obtaining data on the location of marine mammals proximate the marine survey area.

19. The method as recited in claim 13, wherein obtaining comprises utilizing at least one hydrophone to capture a range of frequencies expected from marine mammals.

20. A method, comprising:
- obtaining data related to characteristics of a water column in a seismic survey area with an autonomous underwater vehicle;
- directing the autonomous underwater vehicle along water column characteristic interfaces;
- performing a seismic survey throughout the seismic survey area; and
- adjusting survey data based on the location of the water column characteristic interfaces.

21. The method as recited in claim 20, wherein obtaining data comprises obtaining data on the location of marine mammals.

22. The method as recited in claim 20, further comprising updating autonomous underwater vehicle control data to locally adjust the trajectories of the autonomous underwater vehicle while the autonomous underwater vehicle is deployed to obtain data through a local controller that seeks a sensor detected gradient.

23. The method as recited in claim 20, further comprising:
- obtaining the coordinates of the autonomous underwater vehicle;
- processing data collected by the autonomous underwater vehicle to separate current direction and amplitude of force from lift induced forces; and
- based on the processed data, adjusting steering control spread elements to optimize a spread element trajectory.

24. The method as recited in claim 20, further comprising optimizing trajectories of the autonomous underwater vehicle to anticipate current ahead of a seismic spread to provide a recent current regime.

\* \* \* \* \*